United States Patent [19]

Hallworth

[11] Patent Number: 5,022,948

[45] **Date of Patent: * Jun. 11, 1991**

[54] METHOD OF BONDING LAYERS USING DISCRETE AREAS OF ADHESIVE

[75] Inventor: Gerald Hallworth, Ramsbottom, England

[73] Assignee: The Dow Chemical Company, Midland, Mich.

[ * ] Notice: The portion of the term of this patent subsequent to Dec. 18, 2007 has been disclaimed.

[21] Appl. No.: 365,814

[22] Filed: Jun. 14, 1989

Related U.S. Application Data

[63] Continuation-in-part of Ser. No. 128,080, Dec. 3, 1987, which is a continuation of Ser. No. 828,528, Feb. 12, 1986, Pat. No. 4,752,510.

[30] Foreign Application Priority Data

| | | | |
|---|---|---|---|
| Jun. 16, 1988 | [GB] | United Kingdom | 8814282 |
| Nov. 4, 1988 | [GB] | United Kingdom | 8825868 |

[51] Int. Cl.[5] ........ B32B 31/12

[52] U.S. Cl. ........ 156/291; 118/258; 156/283

[58] Field of Search ........ 156/77, 78, 283, 291; 427/406, 407, 414; 118/256, 258

[56] References Cited

U.S. PATENT DOCUMENTS

| | | | |
|---|---|---|---|
| 2,352,463 | 6/1944 | Wenzelberger et al. | 524/55 |
| 2,517,737 | 8/1950 | Travis | 524/55 |
| 2,909,278 | 10/1959 | Blackford | 524/493 |
| 3,904,566 | 9/1975 | Cudby | 524/437 |
| 3,919,973 | 11/1975 | Zimmer | 118/406 |
| 3,925,271 | 12/1975 | Balinth | 524/492 |
| 3,933,579 | 1/1976 | Kershaw et al. | 521/64 |
| 4,016,831 | 4/1977 | James et al. | 118/415 |
| 4,077,809 | 3/1978 | Plunguian et al. | 524/8 |
| 4,094,241 | 6/1978 | Kossler | 118/414 X |
| 4,094,685 | 6/1978 | Lester et al. | 521/76 |
| 4,157,322 | 6/1979 | Colegrove | 523/129 |
| 4,179,298 | 12/1979 | Nelson et al. | 521/77 |
| 4,232,136 | 11/1980 | Kovacsay et al. | 521/65 |
| 4,239,821 | 12/1980 | McLean et al. | 118/415 X |
| 4,350,785 | 9/1982 | Habib | 524/55 |
| 4,356,819 | 11/1982 | Potaczek | 524/55 |
| 4,357,373 | 11/1982 | Cooper | 118/414 |
| 4,476,276 | 10/1984 | Gasper | 524/493 |
| 4,505,976 | 3/1985 | Doehnert et al. | 524/55 |
| 4,537,915 | 8/1985 | Oberle et al. | 521/70 |
| 4,585,826 | 4/1986 | Graves | 524/493 |
| 4,626,567 | 12/1986 | Chang | 524/493 |
| 4,647,618 | 3/1987 | Bauman et al. | 521/65 |
| 4,722,954 | 2/1988 | Hallworth | 524/55 |
| 4,752,510 | 6/1988 | Hallworth | 427/256 |
| 4,781,781 | 11/1988 | Hallworth | 156/328 |

FOREIGN PATENT DOCUMENTS

| | | | |
|---|---|---|---|
| 520794 | 1/1956 | Canada | 524/493 |
| 800051 | 11/1988 | Canada | 524/493 |
| 1240652 | 5/1967 | Fed. Rep. of Germany | 524/493 |
| 2357833 | 11/1974 | Fed. Rep. of Germany | 118/406 |
| 3021693 | 12/1981 | Fed. Rep. of Germany | 524/23 |
| 78074 | 6/1980 | Japan | 524/493 |
| 11863 | 1/1982 | Japan | 524/5 |
| 92557 | 6/1982 | Japan | 524/5 |
| 2375 | 1/1983 | Japan | 524/493 |
| 202279 | 11/1984 | Japan | 524/5 |
| 1105538 | 3/1968 | United Kingdom . | |
| 1220387 | 1/1971 | United Kingdom . | |
| 2069477 | 8/1981 | United Kingdom | 524/5 |
| 1604215 | 12/1981 | United Kingdom . | |
| 2171411 | 8/1986 | United Kingdom . | |
| 2172851 | 10/1986 | United Kingdom . | |
| 2212076 | 7/1989 | United Kingdom . | |

*Primary Examiner*—Robert A. Dawson

*Attorney, Agent, or Firm*—Fisher, Christen & Sabol

[57] ABSTRACT

A backing layer and a substrate layer, particularly of fabric-backed tufted carpeting, are bonded together using discrete areas of adhesive applied to one side of the backing layer. The adhesive is applied using a perforated roller (3) with an internal abutment such as a second roller (4). The adhesive material (6) is fed to the inside of the perforated roller (3) and is forced through the perforations with the internal roller (4).

7 Claims, 2 Drawing Sheets

METHOD OF BONDING LAYERS USING DISCRETE AREAS OF ADHESIVE

Figure 1:
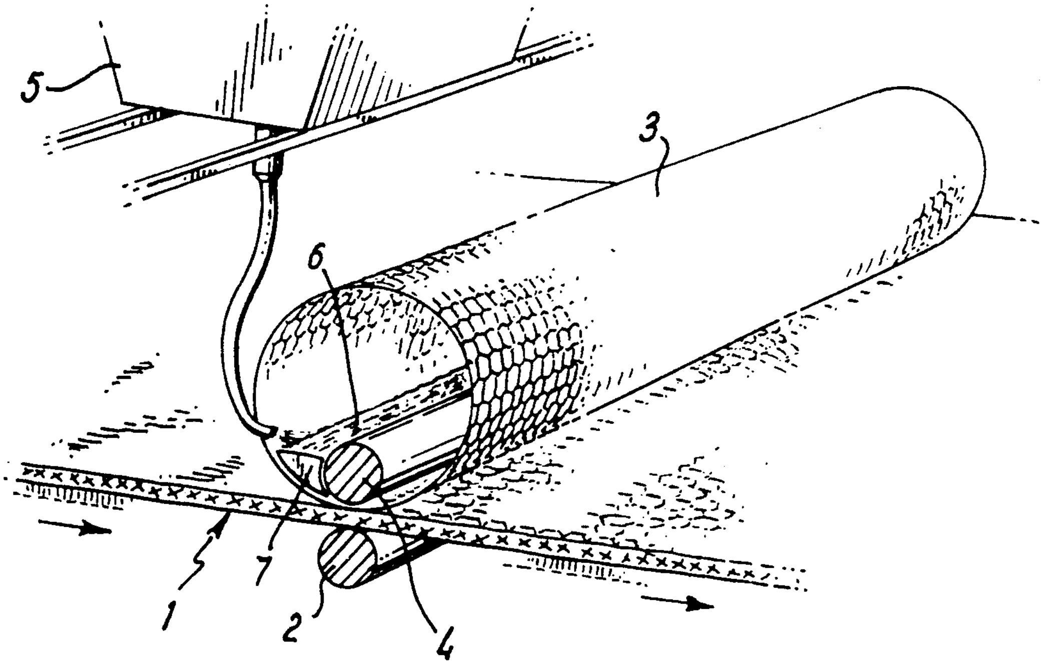

This is a continuation-in-part application of application Ser. No. 128,080, filed Dec. 3, 1987, which was a continuation of application Ser. No. 828,528, filed Feb. 12, 1986, now U.S. Pat. No. 4,752,510.

This invention relates to a method of bonding a backing material layer to a substrate layer in the manufacture of carpeting.

In the manufacture of carpeting comprising a tufted fabric substrate having a back surface to which is bonded a backing material such as a reinforcing fabric or a foam layer it is customary to apply a pre-coat to such surface prior to attachment of the backing material. In the case of a fabric backing material, such as woven jute or polypropylene, it is usual to apply areas of adhesive to one side of the backing material and then to press this side onto the pre-coated substrate surface while the adhesive and the pre-coat are still wet thereby to bond the layers together.

The pre-coat may be a latex foam which is applied to the substrate surface with a doctor member such that the foam collapses and is pressed onto the substrate to form a thin coating. This coating acts to hold the tufts of the fabric layer in position and provides a coherent surface to which the backing material can be more readily bonded. A solid roller is normally used as the doctor member and the pressure or spacing between this and the substrate is adjusted to give a desired thickness and density for the pre-coat.

GB No. 2172851A describes apparatus for applying a coating material to a surface which comprises a transfer member in the form of a roller having a perforated outer wall, a guide arrangement for moving a surface to be coated in contact with or in close proximity to the roller, a feed arrangement for feeding fluent coating material to the perforated roller to be deposited therefrom onto the surface and an abutment for the coating material within the perforated roller, the said feed arrangement being arranged to supply said fluent coating material to the outside of said perforated outer wall so that it forms a well of such material between the said surface and the said abutment through the perforated wall. GB No. 2172851A describes the use of such apparatus for forming a coating layer having a desired flat or embossed patterned surface on an uneven surface such as the back surface of a tufted fabric layer of carpeting. GB No. 2212076A describes a method of forming a flexible laminate by bonding a backing layer to a precoated textile substrate, said method comprising the steps of:

moving the substrate with a guide arrangement relative to a rotatable transfer roller so that a back surface of the substrate is in contact with or in close proximity to the roller;

feeding fluent settable coating material to the roller to be deposited therefrom onto the said back surface of the substrate;

causing or allowing the deposited coating material to set so as to form a pre-coat on said back surface; and bonding a backing layer to said pre-coated back surface; characterised in that said transfer roller is a hollow perforated roller containing an internal doctor member; the fluent coating material is fed to the roller so as to form a well of the material between and freely in contact with the back surface and the doctor member through the perforated wall of the roller; and the spacing of the roller relative to the substrate and the pressure of the doctor member relative to the perforated wall of the roller are adjusted to give a desired thickness or density of the pre-coat.

Conventionally, application of adhesive to fabric backing material prior to bonding to the pre-coated tufted fabric substrate in the manufacture of carpeting involves passing the backing material in grazing contact with the top of a horizontal roller. The roller sits in a tray of latex adhesive and is rotated so as to transfer small amounts of the adhesive to the backing material. With this arrangement it can be difficult to ensure that exactly the desired amount and distribution of adhesive is applied to the backing material especially having regard to the usual coarse, porous nature of the backing material.

It has now been found that a perforated roller can be used to advantage in the application of discrete areas fo adhesive to a material, particularly reinforcing fabric backing material to be bonded to a tufted fabric substrate layer in the manufacture of carpeting.

According to the invention therefore there is provided a method of bonding a backing material layer to a substrate layer in the manufacture of carpeting wherein discrete areas of adhesive are applied to one side of one of said layers, and said side is pressed into contact with the other of said layers thereby to cause said layers to be bonded together, characterised in that said discrete areas of adhesive are applied to said one side of said one layer with apparatus comprising a roller having a perforated outer wall, the said one layer being moved in contact with or in close proximity to the roller, fluent adhesive material being provided in the interior of the perforated roller, and the roller being moved relative to an abutment which is in contact with or in close proximity to the inner surface of the roller so that said adhesive material is displaced through the perforated wall of the roller and is deposited therefrom onto the said one layer.

With this method the adhesive material can be applied in a particularly convenient manner. Moreover, there is the possibility of achieving careful control of the amount of adhesive material applied.

Most preferably the method is utilised in the context of carpet manufacture where the said one layer to which the adhesive is applied comprises a fabric (e.g. woven jute or polypropylene) backing material and the other layer comprises a preferably pre-coated tufted fabric carpeting substrate layer.

The adhesive material may be of any suitable nature but, in the context of carpet manufacture as mentioned above, the adhesive material may be of the same kind as that used for pre-coat purposes and this may comprise a fluent latex material (possibly foamed).

The adhesive material should be such as to withstand the shear forces imposed at the transfer roller. Also, it should have sufficient stability to avoid blockage of equipment used.

Suitably, an aqueous latex emulsion is used i.e. one or more polymers or copolymers capable of forming an emulsion or dispersion in water which is storage stable or at least which can be maintained as a stable homogeneous dispersion for an appreciable period of time sufficient for the purposes of utilisation thereof and which can be set or solidified particularly by drying or curing. The emulsion is preferably one which, in the final stage of polymerization is film forming at temperatures below 150° C., the film-forming properties being due to the properties of the polymer and possibly partly also to the presence of solvents or plasticizers. Suitable example emulsions are given in GB No. 11105538 and GB No. 2171411A and include polymer systems such as:

- copolymers of butadiene and styrene in hot, cold and carboxylated form;
- copolymers of butadiene and acrylonitrile in hot, cold and carboxylated form;
- monopolymers of butadiene and styrene;
- monopólymers of vinyl acetate;
- mono-and copolymers of vinyl chloride;
- mono-and copolymers of methyl, ethyl and butyl acrylate;
- copolymers of ethylene and vinyl acetate;
- copolymers of ethylene, vinyl acetate and vinyl chloride;
- monopolymers of chloroprene;
- water based polyurethane dispersions;
- mono-and copolymers of vinyl and acrylic esters such as PVA or butyl acrylate.

It is not essential to use a latex and thus for example it is possible to use a plastisol such as mono-and copolymers of vinyl chloride in plastisol form. Also starch and starch blends and hot melt adhesives can be used.

The adhesive material may contain other substances for example comprising any one or more of:

- a filler such as limestone, calcium carbonate, dolomite, barytes in an amount of say 0 to 800 parts per 100 parts of polymeric system;
- a soap or surfactant foaming agent such as sodium lauryl sulphate;
- a thickener/emulsion stabilising agent such as polyhydroxy ethyl cellulose, sodium polyacrylate;
- a sequestering agent such as sodium hexametaphosphate;
- a foam stabilising agent such as disodium N-stearyl sulpho-succinamate;

and antioxidant such as an alkylated phenol.

The adhesive material may be set by passing through an oven. Setting may be effected simply by drying. Alternatively setting may involve curing or vulcanising and in this case suitable cross-linking agents (such as sulphur), accelerators, activators and the like may be incorporated as appropriate.

The solids content of the adhesive material may be in the range 25% to 85% or up to 100% for plastisol or hot melts the density say 20g/liter (unfilled) to 2000g/liter. The viscosity may be 200 cps to 60,000 cps or higher, prior to any foaming. Foaming may be effected mechanically e.g. by injection of compressed air. In general density and viscosity would be related so that, for example, the material has a low density at low viscosity and a high density at high viscosity.

The internal abutment used to cause adhesive material to be displaced though the perforated wall may comprise a scraper blade (which may be resiliently flexible) or fixed roll or rotatable roll (rotatable with or counter to the perforated roller). The perforations in the roller may be regularly distributed circular holes or may be any other suitable shape of holes distributed in any suitable manner.

In order to achieve good control of the density and/or thickness or weight of applied adhesive provision may be made for pre-setting or adjusting the spacing of the perforated roller relative to said one side of said one layer and/or the pressure and/or spacing of the said abutment relative to the inner surface of the perforated roller. Thus, for example, in like manner to that described in GB No. 2212076A, the abutment may comprise a resiliently deflectable blade which is non-rotatably mounted within the perforated roller so as to make sliding contact with its inner surface, the blade being movable in a direction towards and away from the inner surface of the roller to adjust the deflection of the blade and hence the said pressure of the doctor member relative to the perforated wall of the roller. Alternatively the internal abutment may be a second roller, particularly a solid roller of rigid or resiliently deflectable surface, which can be adjusted with regard to its spacing from and/or its pressure against the inner surface of the perforated roller.

The perforated roller may be arranged above a support of a guide arrangement which supports said one layer as it moves past the perforated roller, and the spacing of the roller and the support may be adjustable to adjust the spacing of the roller relative to the said one side of the said one layer. The support may comprise a further roller or rollers or slide surface or other structure. Weight of applied adhesive is also a function of density of the adhesive and the pattern of the perforations (i.e. mesh size, shape, distribution). By appropriate selection and control of internal abutment spacing/pressure, adhesive density, and screen pattern a desired weight of adhesive can be applied accurately and consistently across the width of the said one layer.

The bonding method of the invention may be utilised in the context of the manufacture of carpeting where the other layer is a pre-coated tufted fabric to which the pre-coat is applied using the method of GB No. 2212076A as described above. In this case the same treatment station comprising the perforated roller and associated equipment may be used to apply the pre-coat to the tufted fabric layer and to apply the adhesive to the backing layer with appropriate changes in the adjustment and mode of operation of the apparatus as required. Alternatively, separate treatment stations may be used.

Figure 2:
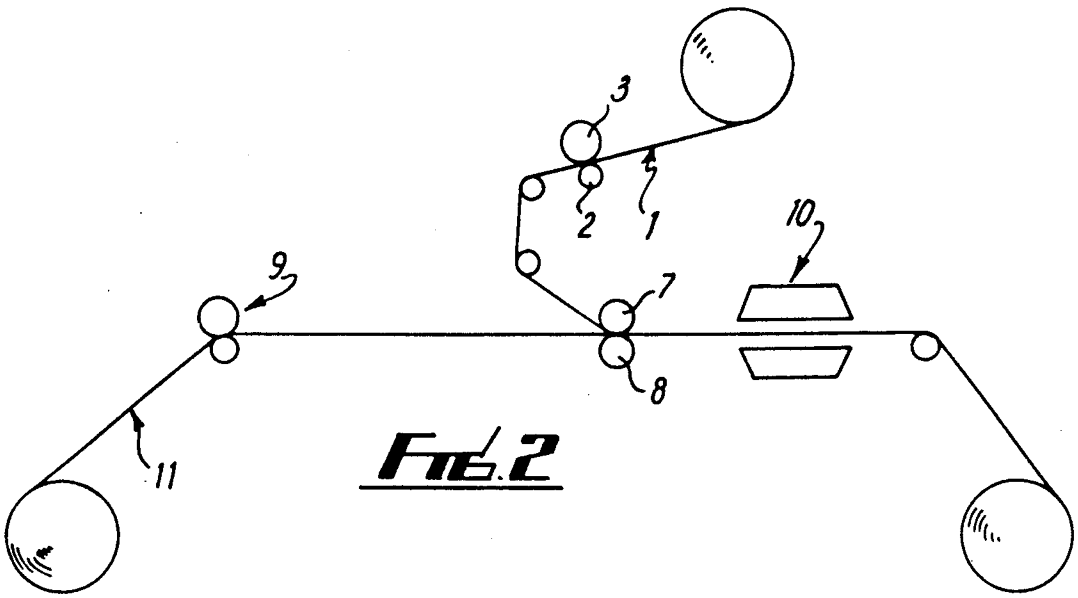
Figure 3:
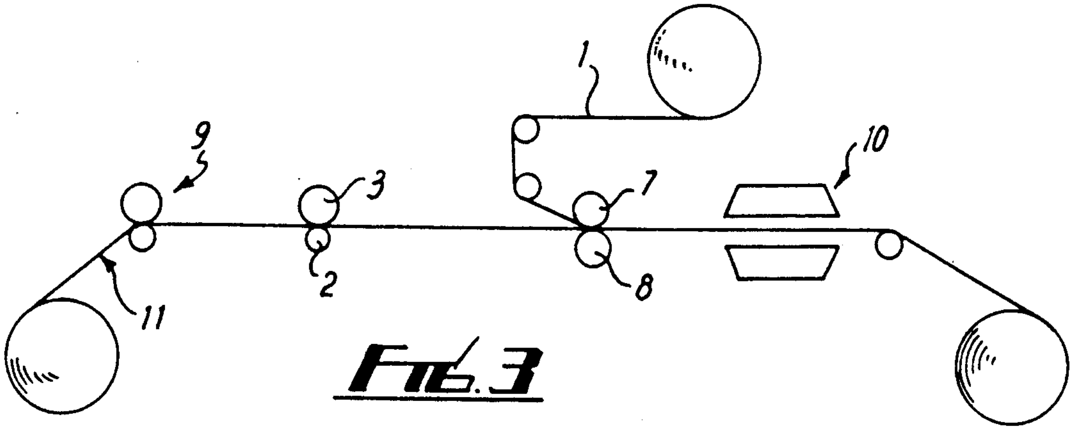
Figure 4:
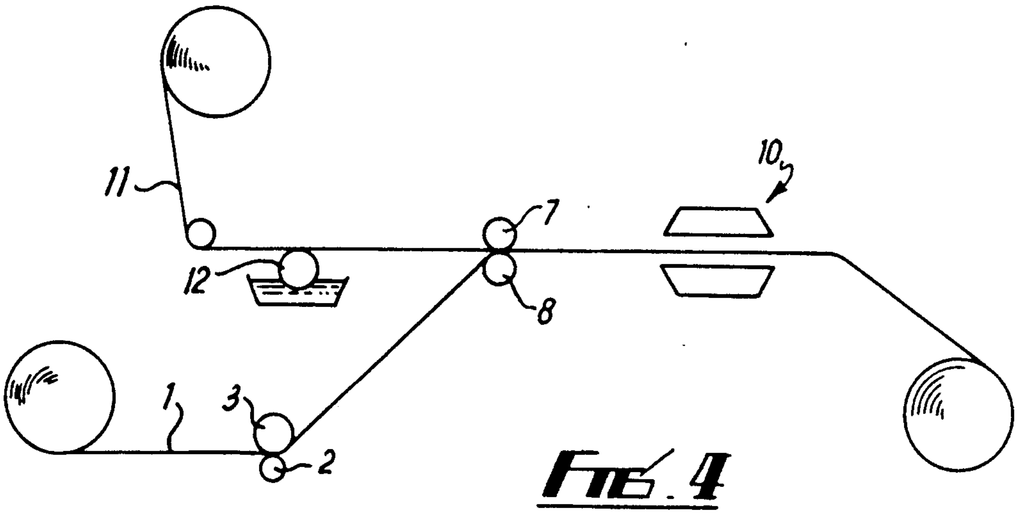

The invention will now be described further by way of example only and with reference to the accompanying drawings in which:

FIG. 1 is a diagrammatic perspective view illustrating application of adhesive material to a fabric backing material in accordance with the method of the present invention; and FIGS. 2–4 are schematic representations showing different procedures for the formation of carpeting material in accordance with the invention.

Carpeting backing material 1, such as woven jute or polypropylene fabric, is fed from a supply roll through an adhesive coating station at which a pattern of discrete areas of adhesive latex material are applied to one surface of the fabric 1.

At the station the fabric 1 phases through a nip defined between a rotatable bottom support roller 2 and a rotatable top perforated roller 3. Within the roller 3 there is a smaller solid roller 4 positioned above the lowermost part of the inner surface of the roller 3. This roller 4 may be fixed or rotatable. Fluent latex material is fed from a supply reservoir 5 as required into the roller 3 (from one end thereof) so that a well 6 is formed in the wedge shaped gap between the roller 4 and the inner surface of the roller 3. The well 6 is retained axially by end plates 7.

The perforated roller 3 and the solid roller 4 are mounted in end frames (not shown) so that the vertical spacing or pressure between the roller 3 and the fabric 1 and between the solid roller 4 and the inside of the perforated rollers 3 can be respectively, independently, adjusted. That is, the vertical position of each (or either) roller 3, 4 can be adjusted to adjust the spacing, and/or if desired each (or either) roller 3, 4 may have a resilient mounting of adjustable resilience (e.g. a hydraulic mounting) to adjust the pressure.

The latex is pressed by the roller 4 through the perforation in the roller 3 on to the fabric surface and discrete areas of latex material are deposited on to the surface. It will be noted that this transfer of material takes place directly from the roller 3 to the fabric surface without having to pass through any intervening structure along the entire axial length of the perforated roller surface. As shown in FIG. 2, before the areas have set, the fabric surface 1 is pressed onto a pre-coated back surface of a tufted fabric carpeting layer 11 by passing the two layers through nip rollers 7, 8. The back surface of the tufted fabric 11 may be pre-coated at station 9 with the same material as that used for the adhesive areas, except that the material mayl be mechanically foamed, and the pre-coating may be effected, as described in GB No. 2212076A, by using apparatus similar to that shownin the drawing hereto except that the coating material is fed to the outside of the perforated roller to form a well between the tufted fabric and the internal roller 6 through the perforated roller 3. The pre-coating may also not be set when the fabric backing is applied, and the fabric layers may then be passed through a drying oven 10 to cause the coating and adhesive materials to set.

FIGS. 3 and 4 show alternative arrangements.

In FIG. 3, the adhesive is applied to the pre-coated substrate layer 11, rather than to the backing layer. A pre-coat station 9, nip rollers 7, 8 and an oven 10 are used in like manner to FIG. 2.

In FIG. 4, the adhesive is applied to the backing material and the pre-coated substrate and the backing material are united by passing between nip rollers 7, 8 and then an oven 10, as in FIG. 2, but the substrate runs from above with its pile uppermost rather than from below with its pile down as in FIG. 2. Pre-coat is with a lower lick roll 12.

In the following Examples different latex materials were used for the adhesive areas, and for the pre-coat, each such material comprising a mixture of the listed ingredients, such ingredients being mechanically foamed by injection of compressed air in the case of the pre-coat but not for the adhesive.

EXAMPLE 1

| | |
|---|---|
| A. | Carboxlated styrene-butadiene rubber latex (60% styrene content) |
| B. | 20% sodium hexametaphosphate (calgon PT) |
| C. | Water |
| D. | Ground limestone (Calmote AD) |
| E. | Sodium lauryl sulphate soap (28% total solids content) (Empicol Lx28) |
| F | Sodium polyacrylat thickener (Texigel SPA12) |

The proportions are (in parts by weight)

| | | |
|---|---|---|
| A. | 208.33 (wet) | 100.00 (dry) |
| B. | 3.75 (wet) | 0.75 (dry) |
| C. | 81.14 (wet) | — (dry) |
| D. | 600.00 (wet) | 600.00 (dry) |
| E. | 1.78 (wet) | 0.50 (dry) |
| F. | 5.00 (wet) | 0.75 (dry) |
| TOTAL | 900.00 (wet) | 702.00 (dry) |

-continued

EXAMPLE 1

Total Solids content = 78%.

Ingredient F is added to give a viscosity of 5-6000 cps.

| | | Wet | Dry |
|---|---|---|---|
| | EXAMPLE 2 | | |
| (1) | Dow Latex 891 | 208.33 | 100.00 |
| (2) | 20% Calgon PT | 3.75 | 0.75 |
| (3) | Dispex N40 | 1.60 | 0.20 |
| | Water | 132.76 | |
| (4) | Calmote AD | 800.00 | 800.00 |
| (5) | Empicol Lx28 | 1.78 | 0.50 |
| (6) | Texigel SPA12 | 10.00 | 1.50 |
| | | 1157.62 | 902.95 |
| | TSC 78% Viscosity 25,000 cps | | |
| | EXAMPLE 3 | | |
| (1) | Dow Latex 852 | 188.67 | 100.0 |
| (5) | Empicol Lx28 | 1.00 | 0.28 |
| (6) | Texigel SPA12 | 2.00 | 0.30 |
| | | 191.67 | 100.58 |
| | TSC 52.4% Viscosity 8,000 cps | | |
| | EXAMPLE 4 | | |
| (7) | Vinamul 18092 | 167.00 | 100.0 |
| (8) | Reomol DBP | 3.00 | 3.00 |
| (4) | Calmote AD | 25.00 | 25.00 |
| (5) | Empicol Lx28 | 1.00 | 0.28 |
| (9) | 2½% Methocel 228 | 10.00 | 0.25 |
| | | 206.00 | 128.53 |
| | TSC 62.4% Viscosity 7,000 cps | | |
| | EXAMPLE 5 | | |
| (10) | Vinamul 93000 | 167.00 | 100.0 |
| (8) | Reomol DBP | 3.00 | 3.00 |
| (5) | Empicol Lx28 | 1.00 | 0.28 |
| (9) | 2½% Methocel 228 | 10.00 | 0.25 |
| | | 181.00 | 103.53 |
| | TSC 57.2% Viscosity 5,000 cps | | |
| | EXAMPLE 6 | | |
| | 60% High Ammonia Natral Latex | 167.0 | 100.0 |
| | 20% Potassium Hydroxide | 5.0 | 1.0 |
| (5) | Empicol Lx28 | 7.14 | 2.0 |
| (2) | 20% Calgon PT | 5.00 | 1.0 |
| | Water | 217.57 | — |
| (4) | Calmote AD | 600.00 | 600.00 |
| (11) | 50% Vulcafor ZDC | 2.00 | 1.00 |
| | 50% Sulphur | 2.00 | 1.00 |
| (12) | 50% Wingstay L | 2.00 | 1.00 |
| (6) | Texigel SPA12 | 10.00 | 1.5 |
| | | 1017.71 | 708.5 |
| | TSC 69.6% Viscosity 8,000 cps | | |
| | EXAMPLE 7 | | |
| (13) | Intex 131 | 154.00 | 100.0 |
| | 50% Vulcafor ZDC | 2.00 | 1.0 |
| | 50% Sulphur | 4.00 | 2.0 |
| | 50% Zinc Oxide | 2.00 | 1.0 |
| (12) | 50% Wingstay L | 2.00 | 1.0 |
| (6) | Texigel SPA12 | 5.00 | 0.75 |
| | | 169.00 | 105.75 |
| | TSC 62.5% Viscosity 4,000 cps | | |
| | EXAMPLE 8 | | |
| (14) | Polysar 6120 | 200.0 | 100.0 |
| (15) | B. Grade China Clay | 50.0 | 50.0 |
| (16) | BT 3745 | 3.0 | 2.79 |
| (9) | 2½% Methocel 228 | 5.0 | 0.125 |
| | | 258.0 | 152.915 |
| | TSC 59.2% Viscosity 7,000 cps | | |
| | EXAMPLE 9 | | |
| (17) | Neoprene Latex NPR 5587 | 173.9 | 100.0 |
| | 50% Zinc Oxide | 2.0 | 1.0 |
| (5) | Empicol Lx28 | 1.0 | 0.28 |
| (6) | Texigel SPA12 | 2.0 | 0.30 |
| | | 178.9 | 101.58 |

-continued

| | | Wet | Dry |
|---|---|---|---|
| | TSC 56.7% Viscosity 4,000 cps | | |
| | EXAMPLE 10 | | |
| (18) | Permutex UE 9002 | 250.0 | 100.0 |
| (5) | Empicol Lx28 | 0.5 | 0.14 |
| (9) | 2½% Methocel 228 | 5.0 | 0.125 |
| | | 255.5 | 100.265 |
| | TSC 39.0% Viscosity 1,500 cps | | |
| | EXAMPLE 11 | | |
| (19) | Chemigum 6495 | 243.90 | 100.0 |
| (3) | Dispex N40 | 0.50 | 0.2 |
| (5) | Empicol Lx28 | 0.50 | 0.14 |
| (4) | Calmote AD | 50.00 | 50.00 |
| (6) | Texigel SPA12 | 5.00 | 151.09 |
| | TSC 50.38% Viscosity 6,000 cps | | |

(1) Trade Mark Dow Chemicals. Styrene/butadiene copolymer.
(2) Trade Mark Albright & Wilson. Sodium hexameta phosphate.
(3) Trade Mark Allied Colloids. Polyacrylate dispersion.
(4) Trade Mark Tarmac. 200's mesh ground limestone.
(5) Trade Mark Albright & Wilson. Sodium lauryl sulphate.
(6) Trade Mark Scott Bader. Sodium polyacrylate.
(7) Trade Mark Vinamul. Ethylene/vinyl acetate/vinyl chloride copolymer.
(8) Trade Mark Geigy. Dibutyl phthalate.
(9) Trade Mark Dow Chemicals. Hydroxy propyl methyl cellulose.
(10) Trade Mark Vinamul. Polyvinyl acetate emulsion.
(11) Trade Mark ICI Chemicals. Zinc diethyl dithiocarbamate.
(12) Trade Mark Goodyear Chemicals. Antioxidant.
(13) Trade Mark Enichem. High solids cold polymerized styrene/butadiene copolymer.
(14) Trade Mark Polysar. Acrylic emulsion.
(15) Trade Mark English China Clay. 300's mesh china clay.
(16) Trade Mark B. I. P. Chemicals. Melamine formaldehyde resin.
(17) Trade Mark Du Pont Chemicals. Polychloroprene latex.
(18) Trade Mark Stahl Chemicals. Polyurethane emulsion.
(19) Trade Mark Goodyear Chemicals. Butadiene/acrylonitrile copolymer.

With the methods described above, the amount of material applied to the backing material to form the adhesive areas can be carefully controlled for example by control of the pressure applied to the roller 3 by the roller 6 and by control of the spacing between the roller 3 and the fabric 1. The adhesive material penetrates well the fibrous surface of the fabric backing and reliable even bonding can be ensured in the end-product carpeting without adverse effects due to either too much or too little adhesive in localised regions.

It is of course to be understood that the invention is not intended to be restricted to the above embodiment which is described by way of example only.

Thus, for example, the described pre-coat may be dried or set prior to applying the adhesive thereto, or prior to contacting the pre-coat with the adhesive coated backing material, as the case may be.

Also, it is to be understood that the pattern of the perforations in the perforated roller need not be uniform throughout its surface. It may be desired to apply different amounts of adhesive to different areas for example to ensure additional adhesion along edge regions, or along a central region where the carpeting is to be cut, and in this case advantageously the provision of larger or more closely disposed perforations, e.g. at the end regions or in a central region of the perforated roller, can ensure consistent and accurate application of additional quantities of adhesive.

I claim:

1. A method of bonding a backing material layer to a substrate layerin the manufacture of carpeting wherein discrete areas of adhesive are applied to one side of one of said layers, and said side is pressed into contact with the other of said layers thereby to cause said layers to be bonded together, wherein said discrete areas of adhesive are applied to said one side of said one layer with apparatus comprising a roller having a perforated outer wall, the said one layer being moved in contact with or in close proximity to the roller, fluent adhesive material being provided in the interior of the perforated roller, and the roller being moved relative to an abutment which is in contact with or in close proximity to the inner surface of the roller so that said adhesive material is displace through the perforated wall of the roller and is deposited therefrom onto the said one layer.

2. A method according to claim 1, wherein the said one layer comprises a fabric backing material and the other layer comprises a tufted fabric carpeting substrate layer.

3. A method according to claim 2, wherein the fabric carpeting layer is pre-coated.

4. A method according to claim 1, wherein the adhesive material is a latex.

5. A method according to claim 1, wherein the abutment comprises a roll.

6. A method according to claim 1, wherein the abutment comprises a scrape blade.

7. A method according to claim 3, wherein the fabric carpeting substrate layer is pre-coated by a method comprising the steps of:

moving the substrate with a guide arrangement relative to a rotatable transfer roller so that a back surface of the substrate is in contact with or in close proximity to the roller;

feeding fluent settable coating material to the roller to be deposited therefrom onto the said back surface of the substrate;

causing or allowing the deposited coating material to set so as to form a pre-coat on said back surface; wherein said transfer roller is a hollow perforated roller containing an internal doctor member; the fluent coating material is fed to the roller so as to form a well of the material between and freely in contact with the back surface and the doctor member through the perforated wall of the roller; and the spacing of the roller relative to the substrate and the pressure of the doctor member relative to the perforated wall of the roller are adjusted to give a desired thickness or density of the pre-coat.

* * * * *